(12) United States Patent
Mau et al.

(10) Patent No.: US 9,038,019 B2
(45) Date of Patent: May 19, 2015

(54) PAIGE CONTROL FOR ENTERPRISE MOBILE APPLICATIONS

(71) Applicants: Hena Mau, Heidelberg (DE); Thomas Marz, Hassloch (DE); Andreas Kunz, Heidelberg (DE); Ralf Kaltenmaier, Wiesloch (DE)

(72) Inventors: Hena Mau, Heidelberg (DE); Thomas Marz, Hassloch (DE); Andreas Kunz, Heidelberg (DE); Ralf Kaltenmaier, Wiesloch (DE)

(73) Assignee: SAP SE, Walldorf (DE)

( * ) Notice: Subject to any disclaimer, the term of this patent is extended or adjusted under 35 U.S.C. 154(b) by 31 days.

(21) Appl. No.: 13/759,500

(22) Filed: Feb. 5, 2013

(65) Prior Publication Data

US 2014/0223414 A1 Aug. 7, 2014

(51) Int. Cl.
*G06F 9/44* (2006.01)

(52) U.S. Cl.
CPC ... *G06F 8/34* (2013.01); *G06F 8/36* (2013.01); *G06F 8/38* (2013.01)

(58) Field of Classification Search
None
See application file for complete search history.

(56) References Cited

U.S. PATENT DOCUMENTS

| | | | |
|---|---|---|---|
| 6,342,907 B1 | 1/2002 | Petty et al. | |
| 6,920,143 B1* | 7/2005 | Ortiz et al. | 370/401 |
| 7,240,327 B2 | 7/2007 | Singh et al. | |
| 7,689,923 B2* | 3/2010 | Massasso et al. | 715/762 |
| 8,136,100 B1* | 3/2012 | Goldman | 717/136 |
| 8,204,870 B2 | 6/2012 | Mukkamala et al. | |
| 8,261,231 B1 | 9/2012 | Hirsch et al. | |
| 8,271,608 B2* | 9/2012 | Mahaffey et al. | 709/217 |
| 8,437,499 B2* | 5/2013 | Case | 382/100 |
| 8,516,435 B2* | 8/2013 | Akkiraju et al. | 717/104 |
| 8,635,522 B2 | 1/2014 | Lee et al. | |
| 2003/0070061 A1* | 4/2003 | Wong et al. | 712/220 |
| 2004/0237064 A1* | 11/2004 | Liu et al. | 717/101 |
| 2006/0129972 A1 | 6/2006 | Tyburski et al. | |
| 2008/0215672 A1 | 9/2008 | Kloba et al. | |
| 2009/0158135 A1* | 6/2009 | Dittmar et al. | 715/226 |
| 2010/0017812 A1 | 1/2010 | Nigam | |
| 2010/0077386 A1* | 3/2010 | Akkiraju et al. | 717/136 |
| 2010/0100591 A1* | 4/2010 | Mahaffey et al. | 709/204 |
| 2011/0078678 A1 | 3/2011 | Matthews et al. | |
| 2012/0066673 A1 | 3/2012 | Miller | |
| 2012/0084864 A1* | 4/2012 | Mahaffey et al. | 726/24 |
| 2012/0284686 A1 | 11/2012 | Sharrma et al. | |
| 2013/0007698 A1* | 1/2013 | Warila et al. | 717/106 |
| 2013/0152067 A1 | 6/2013 | Fernandez-Ruiz et al. | |
| 2013/0205277 A1 | 8/2013 | Seven et al. | |
| 2013/0263112 A1 | 10/2013 | Fernandez-Ruiz et al. | |
| 2014/0019891 A1 | 1/2014 | Borah | |
| 2014/0035945 A1* | 2/2014 | Anglin et al. | 345/619 |

OTHER PUBLICATIONS

Qooxdoo Home page: A Univversal JavaScript framework; 2 pages (http://qooxdoo.org/) ; last visited on Jan. 4, 2013.

* cited by examiner

*Primary Examiner* — Isaac T Tecklu
(74) *Attorney, Agent, or Firm* — Fish & Richardson P.C.

(57) ABSTRACT

The disclosure generally describes computer-implemented methods, software, and systems for generating and using platform-independent code. A computer-implemented method includes: identifying a user interface library that includes abstractions of user interface elements, each abstraction being platform-independent and associated with platform-specific code including user interface code unique to different platforms; receiving application code at design time that includes an abstraction of a user interface element; and storing the application code for use on a client device. At subsequent execution time, the application code is configured to: determine platform-specific information of the client device; execute platform-specific lines of code appropriate for the client device; and present the user interface element in a user interface of the client device in a way that is appropriate for the client device.

20 Claims, 5 Drawing Sheets

| Abstractions | | |
|---|---|---|
| Page Control Abstraction 202 | First Platform 204a | • NavButton: this is mapped to a "Back" button on the left-hand side<br>• Icon: this is not shown as it is not a native pattern<br>• Title: the title is displayed in the center of the page header  ⟵ 206a<br>• Actions: the pattern "Action Sheet" is used to display the actions |
| | Second Platform 204b | • NavButton: this is mapped to the "Up" button is used on the left hand side<br>• Icon: this is mapped to the platform's application icon  ⟵ 206b<br>• Title: the title is displayed just right of the application icon<br>• Actions: the actions are mapped to an platform's action overflow menu |
| | Third Platform 204c | • NavButton: this is not shown because there is no software navigation button in Mobile (just a hardware button)<br>• Icon: this is not shown as it is not a native pattern<br>• Title: the title is displayed in the center of the page header with a very prominent font size and family ⟵ 206c<br>• Actions: the actions are mapped to a mobile action overflow positioned in the page footer |
| | ... | ... |

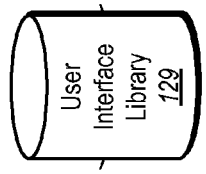

FIG. 2

PAIGE CONTROL FOR ENTERPRISE MOBILE APPLICATIONS

TECHNICAL FIELD

The present disclosure relates to computer-implemented methods, software, and systems for applications that are executable on different platforms.

BACKGROUND

Programmers develop software of various kinds, including applications that execute on client devices used by users. For example, users may run applications on smartphones, laptop computers, tablet computers, set-top boxes, personal computers, and/or any other computing devices capable of running an application. Each of these types of platforms can have a different operating system, and each operating system may have different versions. When programmers write code, they typically need to account for differences in the user interfaces of the different platform types.

Software engineering can make use of various concepts when dealing with ideas associated with computer software. For example, abstraction is a concept that can simplify how programmers deal with code, e.g., the use of function, subroutine, method, procedure or other types of calls from a program. As an example, a programmer may include a call to an UpdateCustomerAddress function at the abstracted level. However, behind the abstraction can be the implementation details, often specific to a particular platform, database, or other constraint, such as operations for locating the customer record in the data base, replacing the existing address with the new one, rewriting the record, and updating the LastChangedBy field.

SUMMARY

The disclosure generally describes computer-implemented methods, software, and systems for generating and using platform-independent code. For example, the platform-independent code can include platform-specific code that is selected at run-time based on a determination of the type of platform on which the code is running One computer-implemented method includes: identifying a user interface library that includes abstractions of user interface elements, each abstraction being platform-independent and associated with platform-specific code including user interface code unique to different platforms; receiving application code at design time that includes an abstraction of a user interface element; and storing the application code for use on a client device. At subsequent execution time, the application code is configured to: determine platform-specific information of the client device; execute platform-specific lines of code appropriate for the client device; and present the user interface element in a user interface of the client device in a way that is appropriate for the client device.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, the abstraction is a page control.

In a second aspect combinable with any of the previous aspects, the platform-specific information includes an operating system and a version associated with the client device.

In a third aspect combinable with any of the previous aspects, the user interface code identifies a structure and a behavior for a given platform.

In a fourth aspect combinable with any of the previous aspects, the page control includes at least a header, a body, and a footer.

In a fifth aspect combinable with any of the previous aspects, some user interface elements are not presented in the user interface based at least on the platform-specific information of the client device.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 2 is a block diagram illustrating an example abstraction for different platforms.

Like reference numbers and designations in the various drawings indicate like elements.

DETAILED DESCRIPTION

Figure 1:
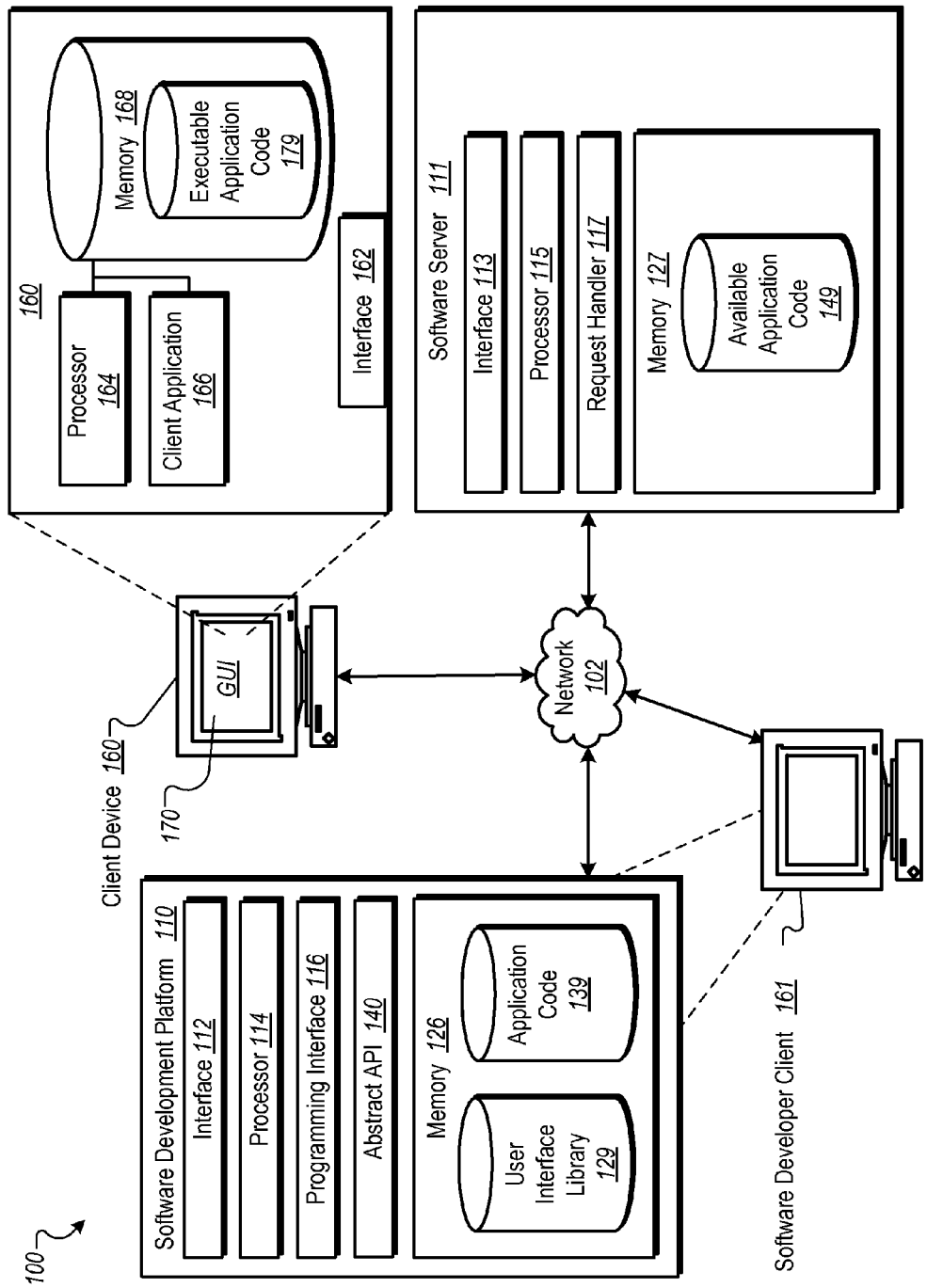
FIG. 1 is a block diagram illustrating an example environment for generating and using platform-independent code.

This disclosure generally describes computer-implemented methods, software, and systems for generating and using platform-independent code. One traditional way of creating and/or developing an application that is to be executed on different mobile devices is to develop the application in the native language that is supported by each mobile device platform on which the application can be deployed. This can cause problems because the same application has to be built multiple times in order to have the application supported on different mobile platforms, e.g., iOS for Apple, or android for Google, and so on. This can also cause a significant amount of overhead both in terms of development and maintenance, such as if the application code needs to be modified for some reason.

Further, in the traditional mobile application development world, applications are typically built with the dedicated native programming languages supported by the mobile platforms, e.g. iPhone/iPad applications are built with Objective-C, whereas android applications are built mainly with Java. An incompatibility problem has evolved, as these applications cannot execute cross-platform. This traditional way of development leads to several issues such as high overhead in redeveloping the same application on another platform with the native platform-dependent programming language, which also results in high maintenance cost. However, if platform-independent code can be written, these problems can be alleviated.

For example, the platform-independent code can include platform-specific code that is selected at run-time based on a determination of the type of platform on which the code is running The subject matter described in this specification can be implemented in particular implementations so as to realize one or more of the following advantages. First, programmers can write a single version of a program that can be executed on any supported platform. Second, programmers do not need to know the details of how user interfaces vary among different platforms, which user interface elements are (or are not) used by a particular platform, or what the visual representation of a user interface element is on a particular platform. Third, programmers need not learn and write application code in multiple native languages. Fourth, software maintenance costs can be saved because only a single version of an application needs to be maintained.

Part of a solution that includes platform-independent code can use a page control that can be part of a UI library, e.g., an HTML5-based library. One advantage of using HTML5 instead of native platform-dependent programming languages is that HTML5 is supported in all of the mobile devices. Applications developed using HTML5 can run on browsers and/or in a web container. The page control is a basic container for a mobile application screen. The page control adapts both the visual and interaction design based on the mobile device platform so that it provides the look and feel and same user experience to an end-user as if the application is built with the platform's native programming language. This can provide a significant advantage because an application using the page control only needs to be built once and still appears to the user as a native application on every mobile platform.

A page control is composed of three parts: a header, a content area, and a footer. In the header, there is the possibility to include a navigation button, an icon, a title, and a list of actions to be triggered. All of these elements can be rendered in the style according to the existing running platform, and those elements that are not supported on the running platform can be automatically hidden. For example, when an icon is specified but is not supported on an Apple device, the icon is simply not rendered on the screen. The content area is an area in the page control in which to include in the actual business logic of the application. The footer provides extra space for the application to include actions or additional description to the application.

FIG. 1 illustrates an example environment 100 for generating and using platform-independent code. Specifically, the illustrated environment 100 includes at least one software development platform 110, at least one software server 111, at least one client device 160, and at least one software developer client device 161 all of which are communicably coupled using a network 102. For example, a programmer using the software developer client device 161 can generate application code that is stored on the software server 111 and used on one or more client devices 160. In some implementations, the software development platform 110 and the software server 111 can be combined in a single entity.

The software development platform 110 comprises an electronic computing device operable to make available and use components in a user interface library 129 to generate application code 139. The user interface library 129 includes abstractions of user interface elements for controls (e.g., a page control) that the programmer can include in application code 139. The application code 139, once it is complete, can be stored at one or more software servers 111, e.g., in available application code 149. From there, the application code 139 can be accessed by multiple client devices 160, where it can be stored locally as executable application code 179.

As used in the present disclosure, the term "computer" is intended to encompass any suitable processing device. For example, although FIG. 1 illustrates a single software development platform 110 and a single software server 111, the environment 100 can be implemented using two or more development platforms 110 and/or software servers 111. The environment 100 can also be implemented using computers other than servers, including a server pool. Indeed, components of the environment 100 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated components of the environment 100 may be adapted to execute any operating system, including Linux, UNIX, Windows, Mac OS®, Java™, Android™, iOS or any other suitable operating system. According to some implementations, components of the environment 100 may also include, or be communicably coupled with, an e-mail server, a Web server, a caching server, a streaming data server, and/or other suitable server(s). In some implementations, components of the environment 100 may be distributed in different locations and coupled using the network 102.

The software development platform 110 includes an interface 112, a processor 114, a programming interface 116, and a memory 126. The interface 112 is used by the software development platform 110 for communicating with other systems in a distributed environment, connected to the network 102 (e.g., the client device 160), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The programming interface 116 can, for example, serve as the interface by which a programmer develops application code. The programming interface 116 can interface with the user interface library 129 in order to allow the programmer to develop application code 139 using abstractions, e.g., that allow the programmer to write code a single time in an abstracted way and let components of the user interface library 129 take care of the details for generating code that is platform-independent. For example, using abstractions provided by the user interface library 129, the programmer can write a single version of page control code for an XYZ sports equipment web page. The application code 139 that is automatically generated can contain any machine-specific logic that allows the application code 139 to execute correctly on any supported platform.

The software development platform 110 includes an abstract application programming Interface (API) 140 that includes code-level abstractions that programmers can use when developing application code 139. For example, the abstract API 140 can include methods for incorporating abstractions such as title, icon, showNavButton, navButtonText, navButtonPressed, and actions. Other abstractions are possible.

The software development platform 110 also includes the memory 126, or multiple memories 126. The memory 126 may include any type of memory or database module and may take the form of volatile and/or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the software development platform 110. Additionally, the memory 126 may include any other appropriate data, such as VPN applications, firmware logs and policies, firewall policies, a security or access log, print or other reporting files, as well as others. In some implementations, memory 126 includes the user interface library 129 (described above) and application code 139. Other components within the memory 126 are possible.

The software server 111 includes an interface 113, a processor 115, a request handler 117, and a memory 127. The interface 113 is used by the software server 111 for communicating with other systems in a distributed environment, connected to the network 102 (e.g., the client device 160), as well as other systems (not illustrated) communicably coupled to the network 102. Generally, the interface 113 comprises logic encoded in software and/or hardware in a suitable combination and operable to communicate with the network 102. More specifically, the interface 113 may comprise software supporting one or more communication protocols associated with communications such that the network 102 or interface's hardware is operable to communicate physical signals within and outside of the illustrated environment 100.

The request handler 117 can, for example, handle requests for application code received from systems and/or devices external to the software server 111. For example the request handler 117 can handle a request received from the client device 160 for application code associated with the XYZ sports web page that may be provided on the client device 160. In response to the request, the request handler 117 can provide the corresponding application code, e.g., from available application code 149.

The software server 111 also includes the memory 127, or multiple memories 127. The memory 127 may include any type of memory or database module and may take the form of volatile and/or non-volatile memory including, without limitation, magnetic media, optical media, random access memory (RAM), read-only memory (ROM), removable media, or any other suitable local or remote memory component. The memory 127 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the software server 111. Additionally, the memory 127 may include any other appropriate data, such as VPN applications, firmware logs and policies, firewall policies, a security or access log, print or other reporting files, as well as others. In some implementations, memory 127 includes the available application code 149. Other components within the memory 127 are possible.

The illustrated environment of FIG. 1 also includes the client device 160, or multiple client devices 160. The client device 160 may be any computing device operable to connect to, or communicate with, at least the software server 111 over the network 102 using a wire-line or wireless connection. In general, the client device 160 comprises an electronic computer device operable to receive, transmit, process, and store any appropriate data associated with the environment 100 of FIG. 1.

The illustrated client device 160 further includes a client application 166. The client application 166 is any type of application that allows the client device 160 to request and view content on the client device 160. In some implementations, the client application 166 can be and/or include a Web browser or some other type of application. In some implementations, the client application 166 can use parameters, metadata, and other information received at launch to access a particular set of data received from the software development platform 110. Client applications 166 can also include applications by which the user of the client device 160 execute application code received from the software server 111.

The illustrated client device 160 further includes an interface 162, a processor 164, and a memory 168. The interface 162 is used by the client device 160 for communicating with other systems in a distributed environment—including within the environment 100—connected to the network 102. For example, the interface 162 can enable communication with the software server 111, as well as other systems communicably coupled to the network 102 (not illustrated). Generally, the interface 162 comprises logic encoded in software and/or hardware in a suitable combination and operable to communicate with the network 102. More specifically, the interface 162 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including JavaScript™, Hyper-Text Mark-up Language (HTML), HTML5, C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 160 includes the processor 164. Although illustrated as the single processor 164 in FIG. 1, two or more processors 164 may be used according to particular needs, desires, or particular implementations of the environment 100. Each processor 164 may be a central processing unit (CPU), an application specific integrated circuit (ASIC), a field-programmable gate array (FPGA), or another suitable component. Generally, the processor 164 executes instructions and manipulates data to perform the operations of the client device 160. Specifically, the processor 164 executes the functionality required to send requests to, and process responses from, the software server 111.

The illustrated client device 160 also includes a memory 168, or multiple memories 168. The memory 168 may include any memory or database module and may take the form of volatile or non-volatile memory including, without limitation, magnetic media, optical media, random access memory (RAM), read-only memory (ROM), removable media, or any other suitable local or remote memory component. The memory 168 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 160. Additionally, the memory 168 may include any other appropriate data, such as VPN applications, firmware logs and policies, firewall policies, a security or access log, print or other reporting files, as well as others.

The illustrated client device 160 is intended to encompass any computing device such as a smartphone, tablet computing device, PDA, desktop computer, laptop/notebook computer, wireless data port, one or more processors within these devices, or any other suitable processing device. For example, the client device 160 may comprise a computer that includes an input device, such as a keypad, touch screen, or other device that can accept user information, and an output device that conveys information associated with the client device 160, including digital data, visual information, or a graphical user interface (GUI) 170, as shown with respect to and included by the client device 160. The GUI 170 interfaces with at least a portion of the environment 100 for any suitable purpose, including generating a visual representation of a Web browser and presenting controls such as page controls, e.g., in ways that are specific to each type of platform that the client device 160 can be.

FIG. 2 is a block diagram illustrating an example abstraction 202 for different platforms. For example, the abstraction 202 can be an abstraction for a page control that includes separate platform-specific abstraction details 204a-204c corresponding to first, second and third platforms (e.g., mobile devices made by different manufacturers). Other platform-specific abstraction details are possible, e.g., corresponding to other devices and/or versions made by the same or different manufacturers as the devices associated with the platform-specific abstraction details 204a-204c.

As an example, the page control abstraction 202 can be used by a programmer (or software developer) when writing application code associated with a page control. The use by the programmer can occur, for example, when the programmer uses components of the user interface library 129 and/or other abstraction-related resources. The programmer need only to include page control-related code (e.g., as keywords and other code) from the user interface library 129 and define or include specific information (e.g., as coding details) as to how the page control is to work. While the concept of a page control is a platform-independent abstraction, the platform-specific abstraction details 204a-204c are specific to each of the associated platforms. The user interface library 129 can include the platform-specific abstraction details 204a-204c for other types of platforms and/or versions not shown in FIG. 2 that also may host application code.

When incorporating a page control in application code, the programmer may specify various user interface elements for the page control, e.g., including one or more of a title, an icon, a showNavButton, one or more navButtonText options, one or more navButtonPressed options, and actions that can be performed using the user interface. In some implementations, the parameters and/or options can be part of, and defined using, an application programmer interface (API) exposed to or available to the programmer, such as the programming interface 116 of FIG. 1. Other user interface elements, parameters, and options for the page control are possible. When the application code is saved, the software development platform 110 can automatically access abstraction information from the user interface library 129 in order to generate and save platform-independent code that includes platform-specific logic. When the application code saved, it automatically includes platform-specific logic so that the application code can execute on any accounted-for platform and version.

A page control's appearance in a user interface at execution time depends on the specific platform and the associated abstraction details. For example, according to title behavior/structure 206a for the first platform, the title is to be displayed in the center of the page header. According to title behavior/structure 206b for the second platform, for example, the title is to be displayed just to the right of the application icon. According to title behavior/structure 206c for the third platform, for example, the title is to be displayed in the center of the page header with a very prominent font size and family. The user interface library 129 makes it possible to include logic in the generated application code so that, at run-time, these platform-dependent differences occur. In some instances, the information presented in FIG. 2 may be provided as code or pseudo-code appropriate to the particular instance.

Figure 3C:
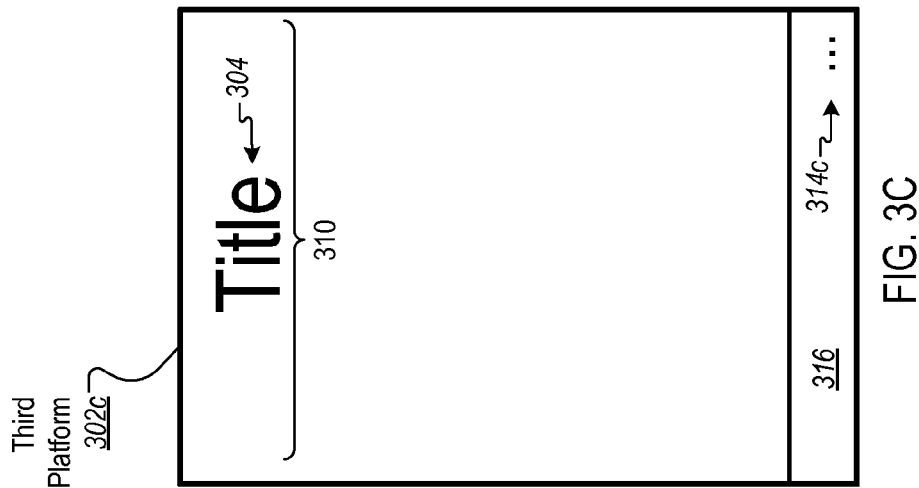
FIGS. 3A-3C show example user interfaces corresponding to different platforms.
Figure 3B:
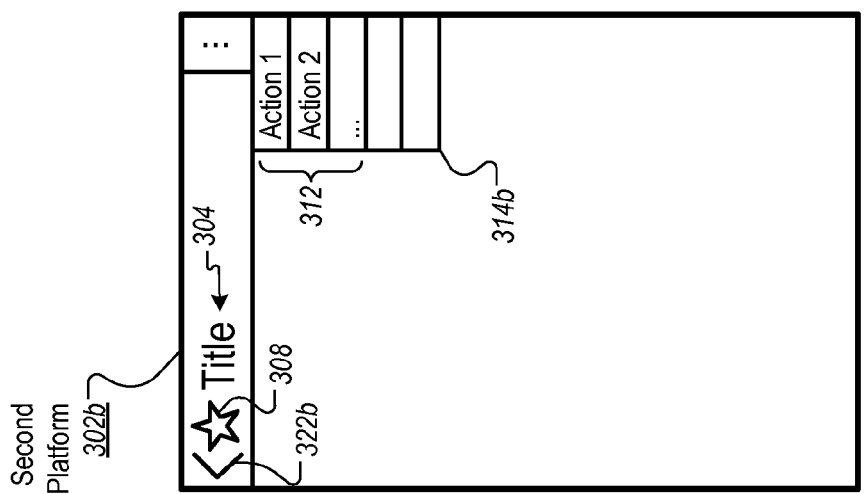
Figure 3A:
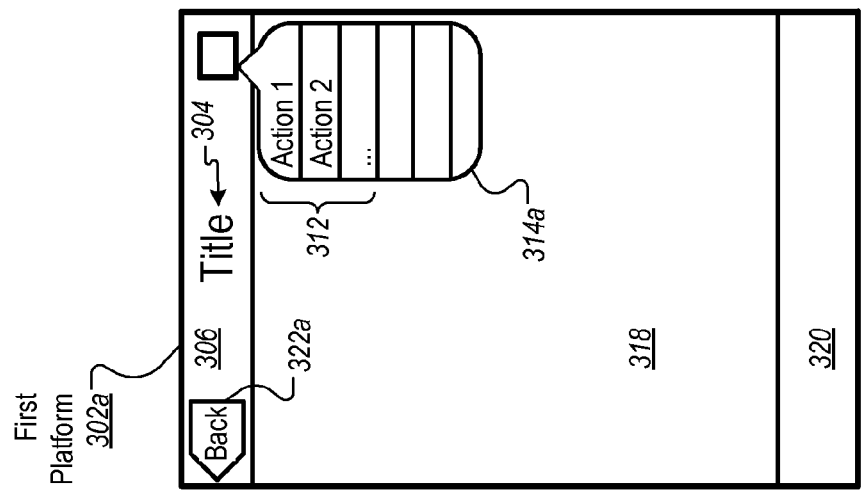

FIGS. 3A-3C show example user interfaces 302a-302c corresponding to different platforms. For example, the user interfaces 302a-302c show examples of how the page control is handled differently on different platforms, e.g., by executing platform-specific code that was generated a single time on a development system based on a programmer's selection of a page control. The selected page control, for example, is associated with an abstraction selected at software design time, while the result of executing the generated application code provides the differences shown in the user interfaces 302a-302c, e.g., associated with first, second and third platforms, respectively.

For example, a title 304, when displayed in the user interface 302a, is displayed in the center of a page header 306, which is consistent with the title behavior/structure 206a. However, in the user interface 302b, the title 304 is displayed just to the right of an application icon 308, which is consistent with the title behavior/structure 206b. Finally, when displayed in the user interface 302c, the title 304 is displayed in the center of a page header 310 with a very prominent font size and family, which is consistent with the title behavior/structure 206c.

In another example of how abstraction details vary by platform type, actions 312 (e.g., action 1, action 2, etc.) appear within, and are user-selectable using, an action sheet 314a on the user interface 302a. The same actions 312 are mapped to an action overflow menu 314b on the user interface 302b for the second platform. In the user interface 302c for the third platform, for example, the actions 312 (not shown) are mapped to a mobile action overflow positioned in a page footer 316.

In some implementations, some user interface elements may be present in some user interfaces but absent from other user interfaces, e.g., depending on the platform-specific information of the client device. For example, the user interfaces 302a and 302b include navigation buttons 322a and 322b, respectively, but the user interface 302c does not include a visible navigation button. In another example, the user interface 302b includes the application icon 308, but the other user interfaces 302a and 302c do not include an icon. The fact that specific user interfaces and platforms either include or don't a particular user interface element is information that is hidden from a programmer. This type of information hiding can allow the programmer to write code, for example, using abstractions of icons, navigation buttons and other user interface elements, and the particular details of which platforms include which user interface elements occurs at run-time.

FIG. 3A further shows different example areas or parts of a page control. For example, the page shown in the user interface 302a includes the page header 306, a body 318, and a footer 320. Typically, page control elements can be rendered in any of these areas, depending on the platform and if they are rendered at all. Other areas are possible.

Figure 4:
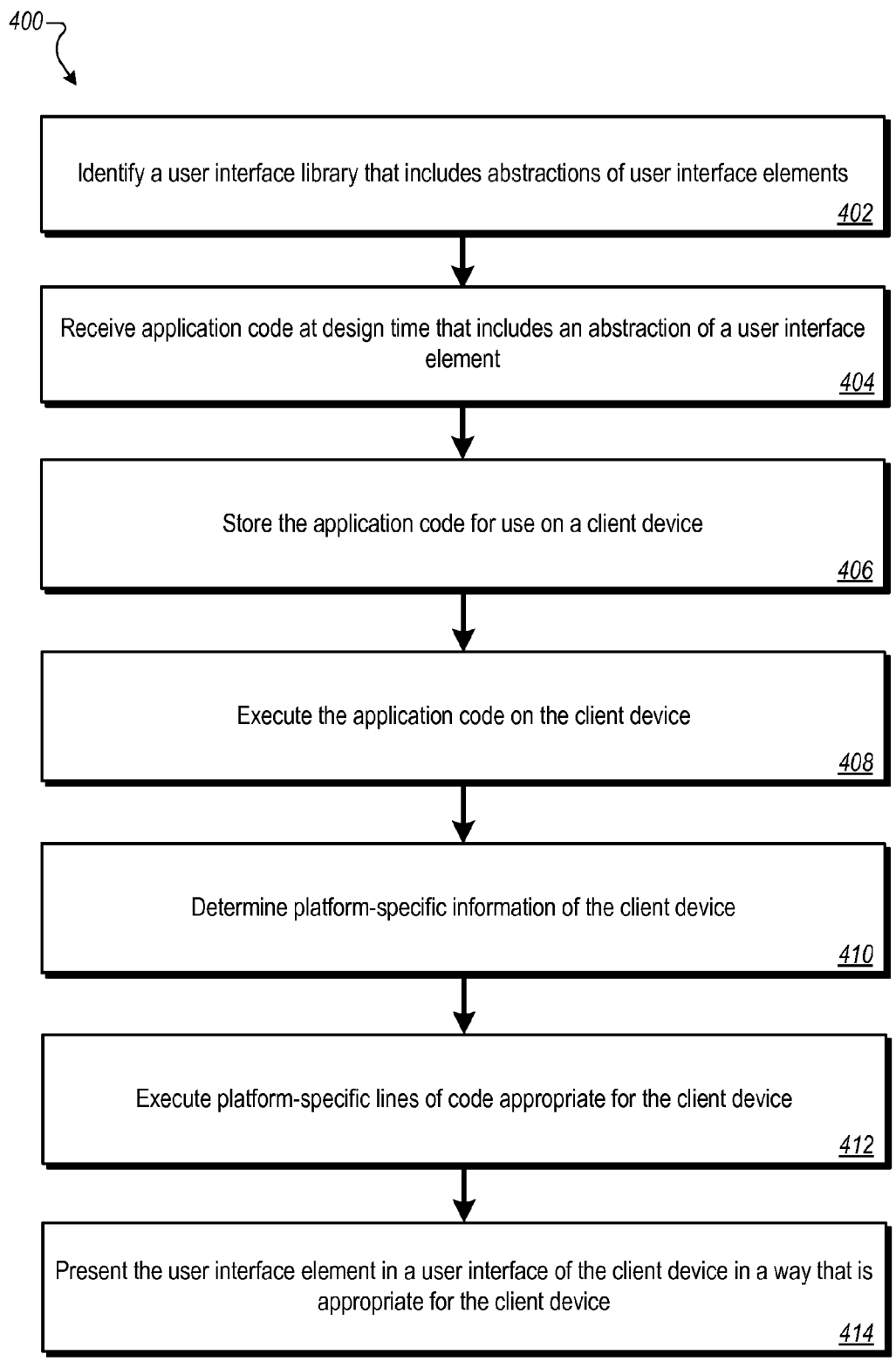
FIG. 4 is a flowchart of an example method for generating and using platform-independent code.

FIG. 4 is a flowchart of an example method 400 for generating and using platform-independent code. For clarity of presentation, the description that follows generally describes method 400 in the context of FIGS. 1, 2, and 3A-3C. However, it will be understood that the method 400 may be performed, for example, by any other suitable system, environment, software, and hardware, or a combination of systems, environments, software, and hardware as appropriate. For example, the software development platform 110, the software server 111, and the client device 160 can be used to execute the method 400.

At 402, a user interface library is identified that includes abstractions of user interface elements. Each abstraction is platform-independent and associated with platform-specific code, including user interface code unique to different platforms. For example, the software development platform 110 can make the user interface library 129 available to a programmer that is using a software development client device 161 to develop application code. The user interface library 129 can include numerous abstractions, such as the page control abstraction 202 and other abstractions associated with user interfaces. The page control abstraction 202 in this example includes abstraction details 204a-204c that are associated with different platforms.

In some implementations, the user interface code identifies a structure and a behavior for a given platform. For example, individual behavior/structures, such as behavior/structures 206a-206c of FIG. 2, are associated with each of the different platforms, and can also be included in the same page control abstraction 202.

At 404, application code is received at design time that includes an abstraction of a user interface element. As an example, a programmer who is developing application code on the software development client device 161 may incorporate code associated with the page control abstraction 202. The application code may be, for example, for a web page that sells XYZ sports equipment. At some time during the development process, the application code may be stored locally in the application code 139. The application code can include, for example, an abstraction for a title associated with the page control. The title is one of several example user interface elements that also include an icon, a showNavButton, one or more navButtonText options, one or more navButtonPressed options, and actions. Other user interface elements are possible for the page control abstraction. Further, other abstractions can have the same or different user interface elements.

In some implementations, the abstraction is a page control. In the current example, the abstraction is a page control associated with the page control abstraction 202, and the page control includes at least a header, a body, and a footer. For example, the page shown in the user interface 302a includes the page header 306, the body 318, and the footer 320.

At 406, the application code is stored for use on a client device. When the application code is stored, it can already be configured to perform the operations that follow for the method 400. For example, the application code that includes components from the user interface library 129, including code associated with the page control abstraction 202, can be stored in the available application code 149 on the software server 111.

At 408, at subsequent execution time, the application code is executed on the client device. As an example, when a user accesses the XYZ sports equipment web page on the client device 160, code for the associated page control can be copied from the available application code 149 to the executable application code 179, local to the client device 160. Here, the processor 164 can execute the executable application code 179.

At 410, platform-specific information of the client device is determined. For example, when the executable application code 179 executes on the client device 160, the processor 164 may determine that the client device 160 is of a first platform type, e.g., associated with the abstraction details 204a.

In some implementations, the platform-specific information includes an operating system and a version associated with the client device. For example, when determining the platform-specific information, the processor 164 may also determine that the operating system is X and has a version V4.3.

At 412, platform-specific lines of code appropriate for the client device are executed. As an example, while executing the executable application code 179, the processor 164 can execute branches in the code that are specific to the first platform, its operating system X, and/or the current operating system version V4.3, as well as any other suitable platform-specific information.

At 414, the user interface element is presented in a user interface of the client device in a way that is appropriate for the client device. As an example, if the user interface element is the title 304 and the client device is the first platform, the title 304 is displayed in the center of a page header 306, which is consistent with the title behavior/structure 206a.

In some implementations, some user interface elements are not presented in the user interface based at least on the platform-specific information of the client device. For example, while navigation buttons 322a and 322b appear in the user interfaces 302a and 302b of FIGS. 3A and 3B, respectively, the user interface 302c shown in FIG. 3C does not include a visible navigation button. In another example, the application icon 308 appears in the user interface 302b of FIG. 3C, but the other user interfaces 302a and 302c (of FIGS. 3A and 3C, respectively) do not include an icon.

Figure 5:
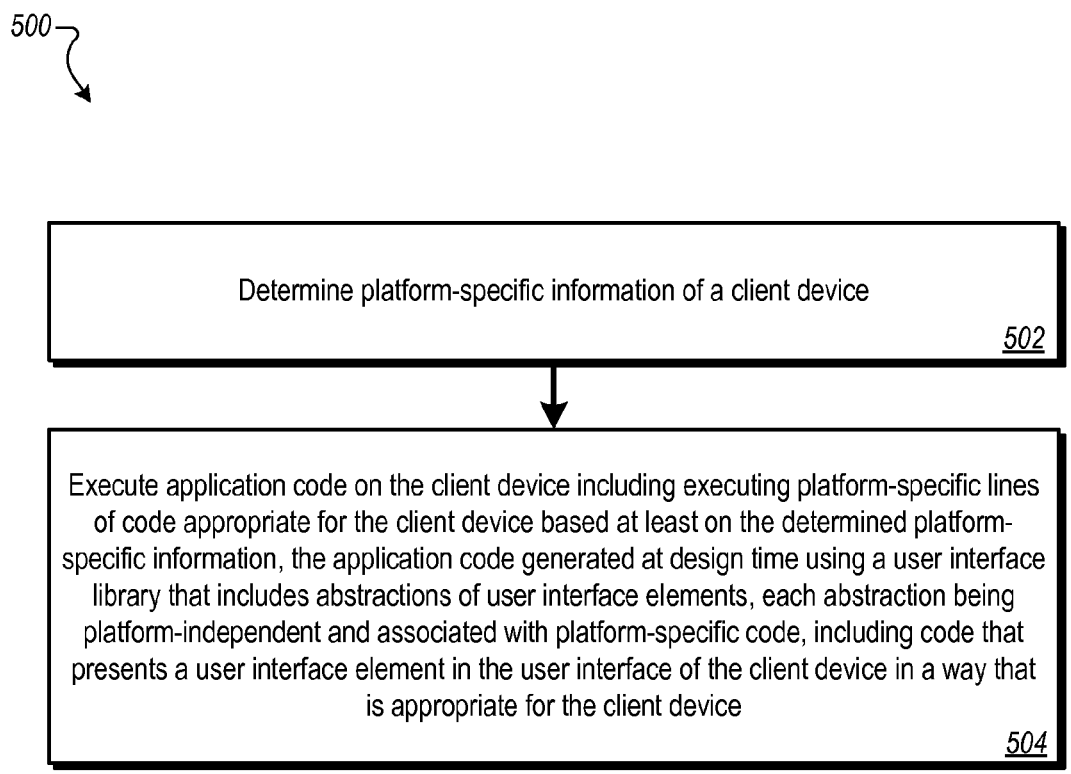
FIG. 5 is a flowchart of an example method for executing platform-independent code.

FIG. 5 is a flowchart of an example method 500 for executing platform-independent code. For clarity of presentation, the description that follows generally describes method 500 in the context of FIGS. 1, 2 and 3A-3C. However, it will be understood that the method 500 may be performed, for example, by any other suitable system, environment, software, and hardware, or a combination of systems, environments, software, and hardware as appropriate. For example, the client device 160 can be used to execute the method 500.

At 502, platform-specific information of a client device is determined. For example, when executable application code 179 begins to execute on the client device 160, the processor 164 can determine that the client device 160 is of a first platform type, e.g., as opposed to being of a second, third, or other platform type. In some implementations, the processor 164 can make this determination by executing code that originated from the user interface library 129 that has a purpose of making platform-independent application code execute on supported platforms.

At 504, application code is executed on the client device including executing platform-specific lines of code appropriate for the client device based at least on the determined platform-specific information. The application code is generated at design time using a user interface library that includes abstractions of user interface elements. Each abstraction is platform-independent and associated with platform-specific code, including code that presents a user interface element in the user interface of the client device in a way that is appropriate for the client device. For example, the processor 164 can execute the application code that is targeted to the particular platform of the client device 160, as described above with reference to FIG. 4 for 408-414 in the method 400.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
identifying a user interface library that includes abstractions of user interface elements, each abstraction being platform-independent and associated with platform-specific code including user interface code unique to different platforms;
receiving application code at design time that includes an abstraction of a user interface element; and
storing the application code for use on a client device, wherein, at subsequent execution time, the application code is configured to:
determine platform-specific information of the client device;
execute platform-specific lines of code appropriate for the client device; and
present the user interface element in a user interface of the client device in a way that is appropriate for the client device.

2. The method of claim 1, wherein the abstraction is a page control.

3. The method of claim 2, wherein the page control includes at least a header, a body, and a footer.

4. The method of claim 1, wherein the platform-specific information includes an operating system and a version associated with the client device.

5. The method of claim 1, wherein the user interface code identifies a structure and a behavior for a given platform.

6. The method of claim 1, wherein some user interface elements are not presented in the user interface based at least on the platform-specific information of the client device.

7. A non-transitory computer-readable media storing instructions to cause a processor to perform operations comprising:
identifying a user interface library that includes abstractions of user interface elements, each abstraction being platform-independent and associated with platform-specific code including user interface code unique to different platforms;
receiving application code at design time that includes an abstraction of a user interface element; and
storing the application code for use on a client device, wherein, at subsequent execution time, the application code is configured to:
determine platform-specific information of the client device;
execute platform-specific lines of code appropriate for the client device; and
present the user interface element in a user interface of the client device in a way that is appropriate for the client device.

8. The computer-readable media of claim 7, wherein the abstraction is a page control.

9. The computer-readable media of claim 7, wherein the page control includes at least a header, a body, and a footer.

10. The computer-readable media claim 7, wherein the platform-specific information includes an operating system and a version associated with the client device.

11. The computer-readable media claim 7, wherein the user interface code identifies a structure and a behavior for a given platform.

12. The computer-readable media claim 7, wherein the some user interface elements are not presented in the user interface based at least on the platform-specific information of the client device.

13. A system, comprising:
memory operable to store map and business-related information; and
at least one hardware processor interoperably coupled to the memory and operable to perform instructions to:
identify a user interface library that includes abstractions of user interface elements, each abstraction being platform-independent and associated with platform-specific code including user interface code unique to different platforms;
receive application code at design time that includes an abstraction of a user interface element; and
store the application code for use on a client device, wherein, at subsequent execution time, the application code is configured to:
determine platform-specific information of the client device;
execute platform-specific lines of code appropriate for the client device; and
present the user interface element in a user interface of the client device in a way that is appropriate for the client device.

14. The system of claim 13, wherein the abstraction is a page control.

15. The system of claim 13, wherein the page control includes at least a header, a body, and a footer.

16. The system of claim 13, wherein the platform-specific information includes an operating system and a version associated with the client device.

17. The system of claim 13, wherein the user interface code identifies a structure and a behavior for a given platform.

18. The system of claim 13, wherein some user interface elements are not presented in the user interface based at least on the platform-specific information of the client device.

19. A computer-implemented method comprising:
   determining platform-specific information of a client device; and
   executing application code on the client device including executing platform-specific lines of code appropriate for the client device based at least on the determined platform-specific information, the application code generated at design time using a user interface library that includes abstractions of user interface elements, each abstraction being platform-independent and associated with platform-specific code, including code that presents a user interface element in the user interface of the client device in a way that is appropriate for the client device.

20. The computer-implemented method of claim 19, wherein the abstractions include a page control.

* * * * *

UNITED STATES PATENT AND TRADEMARK OFFICE
CERTIFICATE OF CORRECTION

| | | |
|---|---|---|
| PATENT NO. | : 9,038,019 B2 | Page 1 of 1 |
| APPLICATION NO. | : 13/759500 | |
| DATED | : May 19, 2015 | |
| INVENTOR(S) | : Hena Mau et al. | |

It is certified that error appears in the above-identified patent and that said Letters Patent is hereby corrected as shown below:

On the Title page, item (54) and in the Specification, col. 1, line 1, the word "PAIGE" should be corrected to "PAGE" so that the entire title should read: -- PAGE CONTROL FOR ENTERPRISE MOBILE APPLICATIONS --

Signed and Sealed this
Twenty-second Day of September, 2015

Michelle K. Lee
*Director of the United States Patent and Trademark Office*